United States Patent
Graham et al.

[15] 3,695,406
[45] Oct. 3, 1972

[54] COUPLING WITH CARBON AND BERYLLIUM FRICTION SURFACES

[72] Inventors: Glenn R. Graham, Saddle River, N.J.; Robert W. Biggs, Chagrin Falls, Ohio

[73] Assignee: Abex Corporation, New York, N.Y.

[22] Filed: Nov. 2, 1970

[21] Appl. No.: 86,060

Related U.S. Application Data

[63] Continuation-in-part of Ser. No. 833,835, May 8, 1969, abandoned.

[52] U.S. Cl. ........192/107 M, 192/70.28, 192/30 W, 188/72.3
[51] Int. Cl. .............................................F16d 13/60
[58] Field of Search......192/107 R, 107 M, 70.28, 30 W; 188/72.3, 70.13, 70.15, 251

[56] References Cited
UNITED STATES PATENTS

| | | |
|---|---|---|
| 1,665,554 | 4/1928 | Kolb..................192/107 R X |
| 2,581,637 | 1/1952 | Danley et al. .......192/107 R X |
| 3,425,524 | 2/1969 | Dewar................192/107 R X |
| 3,473,637 | 10/1969 | Rutt...................192/107 R X |

Primary Examiner—Benjamin W. Wyche
Assistant Examiner—R. Heald
Attorney—Richard MacCutcheon

[57] ABSTRACT

A brake or clutch for extreme heavy duty may have a friction material which is substantially all carbon and which, for periods of disengagement, is free floating rotationally between a pair of solid or segmented metal members. Said metal members may each rotate, or one may rotate while the other does not rotate. Axially short means may support the friction material and be used to serve as a visible warning of wear. Beryllium is a preferred opposing surface material when used with friction material which is substantially all carbon.

2 Claims, 6 Drawing Figures

PATENTED OCT 3 1972 3,695,406

INVENTORS
GLENN R. GRAHAM
& ROBERT W. BIGGS

Richard H. MacCutcheon
ATTORNEY

COUPLING WITH CARBON AND BERYLLIUM FRICTION SURFACES

CROSS REFERENCE TO RELATED APPLICATION

This Application is a continuation-in-part of our copending application Ser. No. 833,835 filed May 8, 1969 now abandoned, and assigned to the assignee of this application.

BACKGROUND

For high energy applications as in the brakes of large commercial and military aircraft, there have been problems of attachment of suitable (e.g., totally inorganic, because any resins would boil out) friction material, e.g., to prior art solid metal backing or carrier plates. Known adhesives can not stand the duty (temperature) involved. Riveting directly is usually unacceptable because of frangibility of the friction material, and the art has turned to expensive, weight adding, and complex arrangements to cup or otherwise hold portions or pads of the desired friction material.

Another problem exists in the mere selection of materials for a high energy "friction couple" comprising a pair of members or facings arranged for selective rubbing friction engagement. As an example, when large, high performance, aircraft are considered, the following criteria have not, compared with the present invention, all been adequately met in the past:

1. Light weight, low inertia,
2. High energy, hence high temperature, operation,
3. Even heating of parts,
4. Good heat dissipation characteristics, and
5. Good friction properties including absence of vibration or chatter during use.

An object of the present invention is to provide simple and inexpensive means for overcoming the above mentioned difficulties.

Other objects and advantages will become apparent from consideration of the description which follows, taken in connection with the accompanying drawing.

DESCRIPTION OF DRAWING

FIG. 5 is a cross section of a shaft portion, while

DESCRIPTION OF EMBODIMENTS

For simplicity, "structural parts," as used in the claims hereafter, can be thought of as parts which have driven, driving or held stationary splines. However, no such limitation is intended. A rivetted facing, or even a housing end, is also a structural part.

Figure 1:
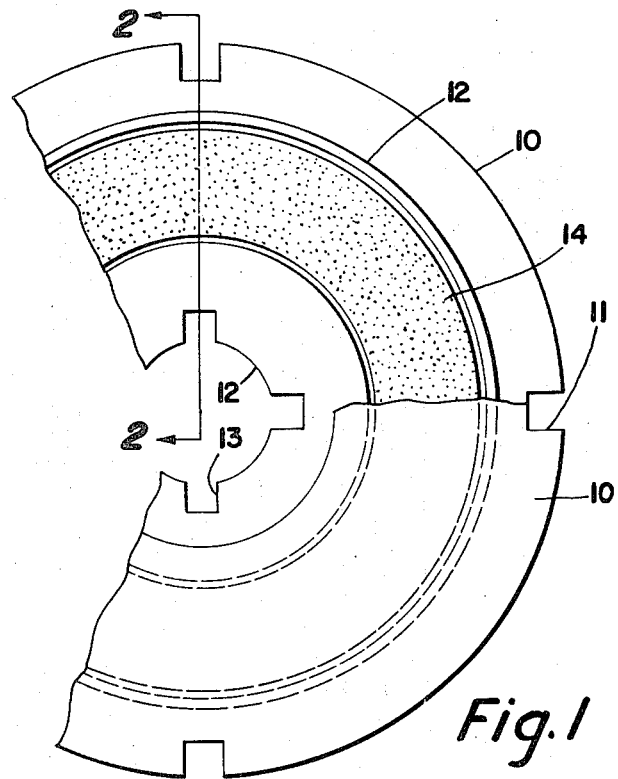
FIG. 1 includes an arrangement according to one aspect of the invention.
Figure 2:
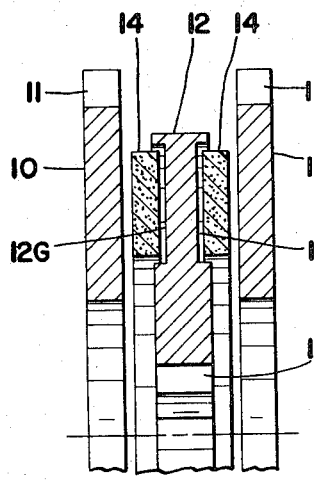
FIG. 2 is a cross section taken on the line 2—2 of FIG. 1.

In FIGS. 1 and 2, structural discs or parts 10 have outer periphery notches 11 engageable by inner splines of a conventional cage (not shown), while a relatively rotatable disc 12 has inner periphery notches 13 engageable with splines of a conventional shaft (not shown). In a multi-disc brake or clutch, the arrangement can of course be repeated, as far down the line as desired. Conventional means (not shown) are used to selectively bring the discs toward one another or apart.

In accordance with one aspect of the present invention, a friction material 14 is in the form of complete shapes which, for the periods of disengagement, are "free floating" rotationally about the main axis as well as axially between the structural disc "pairs."

The notched discs could be of solid metal, or could be of a high temperature refractory, such as a metal oxide, or, as explained hereafter, could be substantially all carbon. For convenience they are called "structural parts."

Each "floating" member might be a complete shape, or the effective or "friction couple" material thereof might take the form of facings secured to a backing. For convenience, such member or members will be referred to as "freely rotatable." The freely rotatable member's effective material can be substantially all carbon. But, because of advances in the art, there is less distinction between friction material and opposing surface material than heretofore. The materials for structural parts and for non-structural parts are reversible.

FIG. 2 shows four friction couples (10 vs. 14, 14 vs. 12, 12 vs. 14, 14 vs. 12). For any one of the friction couples, or for all of them, for light weight, and heat resistance, a substantially all carbon material is a preference for one member of the couple. Thus the rotatable member could be all carbon. The structural member could be all carbon too. But oftimes dissimilar materials are desired in a couple. Applicants have found that rubbing the all-carbon against beryllium is quite satisfactory and, moreover, provides the advantage of the couple consisting of nothing but two materials each of which are characterized by light weight and high heat resistance. It seems to have eluded those in the art in the past. Heretofore no one wanted to rub a refractory against beryllium. Heretofore no one thought of the smear that a substantially all carbon article could give.

In the FIGS. 1 and 2 arrangement, vertical support and alignment for the freely rotatable member material 14, which is shown in the form of rings of rectangular section, is provided by flange portions of disc 12 as defined by grooves 12-G. However, a groove may not be needed. It may only be necessary to support one of the peripheries of each freely rotatable ring (the outer at the bottom, or the inner at its top). In any event, if a flange is provided, the thickness dimension of flange is less than the axial thickness of the freely rotatable member and, as the rotatably free material wears down, ultimately the flange acts as a gage giving a visible indication of wear, at a desirable time before all the rotationally free material is too thin to hold together; although in some cases regular maintenance disassembly may be necessary in order to "see" the warning.

Figure 3:
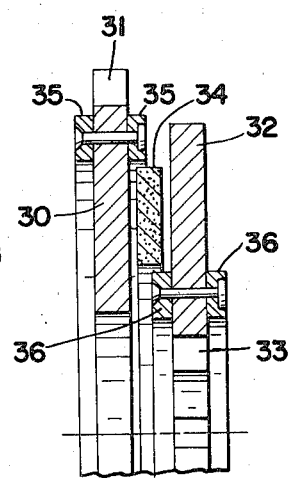
FIG. 3 illustrates a modification.

FIG. 3 shows a modification in which an outer flange 35 (or actually a pair of flanges 35, so that the arrangement can be completed on down the line) is provided by riveting the same to a structural part 30, while an inner flange, or flange pair, is rivetted to a structural part 32, rotatably free member 34 then being confined therebetween.

Figure 4:
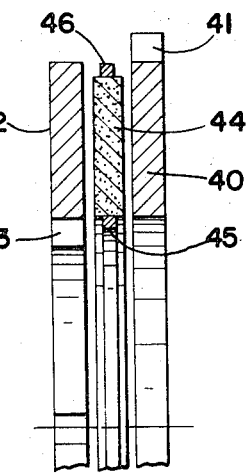
FIG. 4 shows another modification.

In FIG. 4, disc 40 has outer notches 41, disc 42 has inner notches 43, and rotationally free member 44 is supported on (while protected from) either or both of inner shaft splines and outer cage splines (not shown) by hoops or rings 45, 46. Such rings (or ring, since one could be enough) can be of steel and split and deformed and snapped in place (like a piston ring) adjacent inner or outer periphery of the freely rottatable member 44. Or such a ring could be of carbon and could be formed integral with the main body 44. Whether formed integral, or whether attached, or even if not attached to main body, such a ring or flange could still protect main body from splines, and could still serve as a warning of wear.

For any aspect of the present invention, the materials are all inorganic, that is without any resin binder to boil out and thus without any asbestos to degrade. For the freely rotatable member embodiments, the structural parts can be of solid metal, even ferrous. Then, because of the non-necessity of affixing "friction material" to anything, the freely rotatable member or members can be beryllium or titanium, for high strength, low weight, large heat capacity, beryllium being preferred because of its enhancement of these qualities. Or a couple may comprise a steel structural part and a freely rotatable part or member of carbon or of a sintered mix, such as one having an iron base, or it could be a bronze mix.

Because the freely rotatable member needs little shear strength (since it has no splineways nor teeth) and because it presents, or need present, no problem of attachment, according to one preference this "floating" part is substantially 100 percent carbon, as those words are described in pending U.S. Pat. application of Nitz and Graham, Ser. No. 764,120, filed Oct. 1, 1968, and assigned to the assignee of the present invention. Still, as described in that application, carbon filaments can make the substantially 100 percent carbon article strong, and so for a bi-material friction couple the materials can be reversed. Carbon can be the material of the structural part or parts, and beryllium or other metal can be the material of the freely rotatable part.

Figure 5:
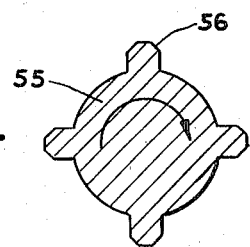

Each of FIGS. 2– 4 show flange means which prevent abrasion of a main body of freely rotatable material. By sacrificing the visible-warning-of-wear feature, it is possible to provide protection against such abrasion in another way. This is shown in FIG. 5. Here a shaft portion 55 is provided with splines whose tooth end edges are 45° bevelled as at 56. In some cases it may suffice to bevel only leading edges.

While each of FIGS. 1– 4 and even 5 relate to at least one freely rotatable member and thus to plural friction couples, according to another aspect of our invention one or more friction couples might have no freely rotatable member.

Figure 6:
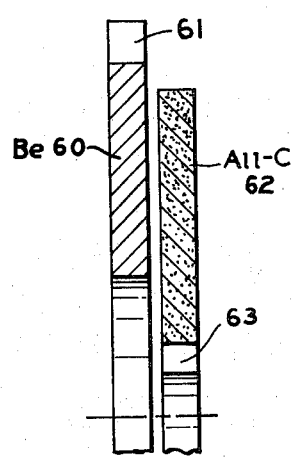
FIG 6 represents the simplest preferred embodiment.

As in FIG. 6, there might be one or more couples involving only structural members, with each such couple having our unique-for-friction-engagement-with-one-another materials Be 60 and All-C 62. With proper dimensioning of notches with respect to splines, here there is no worry about abrasion by spline teeth, while at the interface of the friction couple abrasion of the beryllium 60 is prevented by the nature of the facing material which is carbon 62.

With the embodiments having a freely rotatable member, the material can be tailored to give build-up (of coefficient of friction with heating) according to known practices. Then, during operation, the freely rotatable member will rotate first with one member (while heat builds up at opposite side of floating member due to its friction engagement with other structural member) and then rotate with the other (while the rubbing is transferred back to the first), in novel manner. This results in more even heating, e.g., of radial surfaces of all members, again raising the capacity of the brake or clutch.

There is thus provided light weight, heat resistant apparatus of the class described meeting the object set forth and having the added advantage of increasing design freedom. And this is true for all of the embodiments.

"Substantially" and "predominantly" as used in the claims are to be taken as meaning more than 50 percent, but location is of importance. Thus "substantially all carbon" means that there is not more than 50 percent (dispersed) of friction tailoring or other agent, but the numerical comparison could be anything if the material other than carbon is concentrated as a backing. And "predominately of beryllium" can be taken to mean that there is not more than 50 percent (by weight, as is standard) dispersed additive or additives, but the comparison would not be applicable if a material other than Be is not dispersed within the Be but used only as a protective coating which, at least at wear face, is worn away with an early occurrence of actual use.

While we have illustrated and described particular embodiments, various modifications may obviously be made without departing from the true spirit and scope of our invention which we intend to have defined only by the appended claims taken with all reasonable equivalents.

We claim:

1. A brake or clutch mechanism having a main axis and having conventional splines coaxial thereabout and also having at least two friction couples comprising three coaxial members, one being freely rotatable about the axis and two for mating therewith, each of said friction couples comprising "A" material and, for selective engagement therewith, a "B" material, one of the A and B materials being substantially all carbon at its surface which mates with the other material of the couple, the other of the A and B materials being predominantly a single metal existing as a homogenous, complete and usable structural member which is not only predominantly said single metal at an innermost core thereof which serves as its heat sink but which is also predominantly said single metal at a surface of said member which mates with the other material of the couple and which is also predominantly said single metal at another of its surfaces which exposes itself to splines, each of the A and B material members being relatively free floating axially, and one of them being free floating rotatably, the combination being further characterized by a flange means associated with at least one of said members and for positioning one of the members, the flange means having a thickness less than the thickness of one of the members and for providing a visible warning with wear and before exhaustion and breakup of material.

2. A brake or clutch mechanism having a main axis and having conventional splines coaxial thereabout and also having
at least one friction which has an "A" material and, for selective engagement therewith, a "B" material,
one of the A and B materials being substantially all carbon at its surface which mates with the other material of the couple,
the other of the A and B materials being predominantly beryllium and existing as a homogenous, stand-alone member which is not only beryllium at an innermost core thereof which serves as its heat sink but which is also predominantly beryllium at a surface of said member which mates in rubbing engagement with the other material of the couple and which is also predominantly beryllium at another surface thereof which exposes itself for sliding restraint so that these surfaces present axial sliding and also provide circumferential torque.

* * * * *

UNITED STATES PATENT OFFICE
CERTIFICATE OF CORRECTION

Patent No. 3,695,406　　　　　　　Dated October 3, 1972

Inventor(s) GLENN R. GRAHAM ET AL

It is certified that error appears in the above-identified patent and that said Letters Patent are hereby corrected as shown below:

On the cover sheet [73] the Assignee should read -- The S. K. Wellman Corp., Bedford, Ohio --. Column 3, line 30, "the" should read -- an --.

Signed and sealed this 8th day of May 1973.

(SEAL)
Attest:

EDWARD M. FLETCHER, JR.　　　　　　ROBERT GOTTSCHALK
Attesting Officer　　　　　　　　　Commissioner of Patents